US 11,183,956 B2

(12) United States Patent
Kheraluwala et al.

(10) Patent No.: US 11,183,956 B2
(45) Date of Patent: Nov. 23, 2021

(54) INTEGRATED ELECTRIC PROPULSION SYSTEM

(71) Applicant: Hamilton Sundstrand Corporation, Charlotte, NC (US)

(72) Inventors: Mustansir Kheraluwala, Lake Zurich, IL (US); Tadashi Sawata, Coventry (GB); Michael C. Harke, DeForest, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/361,033

(22) Filed: Mar. 21, 2019

(65) Prior Publication Data

US 2020/0304047 A1    Sep. 24, 2020

(51) Int. Cl.
  *H02P 9/04*     (2006.01)
  *F02B 63/04*    (2006.01)
  *F02D 29/06*    (2006.01)

(52) U.S. Cl.
  CPC .............. *H02P 9/04* (2013.01); *F02B 63/042* (2013.01); *F02D 29/06* (2013.01)

(58) Field of Classification Search
  CPC .. H02P 9/04; H02P 6/08; F02B 63/042; F02D 29/06
  USPC ................................. 290/40 C, 52
  See application file for complete search history.

(56) References Cited

U.S. PATENT DOCUMENTS

| | | | |
|---|---|---|---|
| 5,428,275 A | 6/1995 | Carr et al. | |
| 5,821,707 A * | 10/1998 | Kim | H02P 6/08 318/400.01 |
| 9,048,765 B2 | 6/2015 | Dobbs | |
| 9,586,690 B2 * | 3/2017 | Rajashekara | B64C 11/305 |
| 10,425,029 B1 * | 9/2019 | Beifus | H02P 23/0027 |
| 2013/0001944 A1 | 1/2013 | Hickam et al. | |
| 2013/0038259 A1 * | 2/2013 | Andersen | H02P 1/029 318/400.28 |
| 2013/0249450 A1 | 9/2013 | Kwon et al. | |
| 2018/0265206 A1 | 9/2018 | Himmelmann | |
| 2018/0370608 A1 | 12/2018 | Himmelmann | |

FOREIGN PATENT DOCUMENTS

| | | | | |
|---|---|---|---|---|
| EP | 3228544 A1 | | 10/2017 | |
| EP | 3229368 A1 | * | 10/2017 | .............. H02P 23/26 |
| WO | WO-2009016340 A1 | | 2/2009 | |

OTHER PUBLICATIONS

Extended European search report issued in corresponding EP application No. 19211146.6, dated Jun. 24, 2020.

* cited by examiner

*Primary Examiner* — Charles Reid, Jr.
(74) *Attorney, Agent, or Firm* — Locke Lord LLP; Scott D. Wofsy; Georgi Korobanov

(57) ABSTRACT

An electric propulsion system includes a prime mover, a starter-motor generator configured to be driven by the prime mover to generate electric power, and an electric propulsion motor, and an integrated generator-motor controller arranged to control the supply of the electric power to the electric propulsion motor in response to a control signal, wherein the integrated generator-motor controller includes an active rectifier configured in a first mode to feed-forward to the starter-motor generator a power demand parameter associated with the control signal so as to control the power output of the starter-motor generator in order to start the prime mover.

16 Claims, 3 Drawing Sheets

INTEGRATED ELECTRIC PROPULSION SYSTEM

BACKGROUND

Technological Field

The present disclosure relates to an Integrated Electric Propulsion System, and more particularly to an Integrated Electric Propulsion System having integrated generator-motor controller.

Description of Related Art

A variety of devices are known in electric propulsion systems. In electric propulsion systems, propulsion motors are controlled typically to the speed demand from aircraft controller. Dynamic response of the electric motors can be much higher than that of conventional gas turbines providing new opportunities for more dynamic control of propulsion force for aircraft, which may be used to improve the performance of aircraft.

The conventional methods and systems have generally been considered satisfactory for their intended purpose. However, there is still a need in the art for electric propulsion systems having improved power density and control more efficiency, less weight. There also remains a need in the art for such systems and components that are economically viable. The present disclosure may provide a solution for at least one of these remaining challenges.

SUMMARY OF THE INVENTION

An electric propulsion system includes a prime mover, such as a gas turbine engine, a starter-motor generator, such as a PM generator, configured to be driven by the prime mover to generate electric power, an electric propulsion motor, and an integrated generator-motor controller arranged to control the supply of the electric power to the electric propulsion motor in response to a control signal, wherein the integrated generator-motor controller includes an active rectifier configured in a first mode to feed-forward to the starter-motor generator a power demand parameter associated with the control signal to control the power output of the starter-motor generator. The active rectifier includes a second mode to feed-forward to an inverter a power demand parameter associated with the control signal to control the power output to the electric propulsion motor. The electric propulsion system can include an energy storage device, such as a battery, connected to the integrated generator-motor.

The control signal can include at least one of a motor speed command, a thrust command, a torque command, or a power command. The power demand parameter can also include an instantaneous power demand.

The integrated generator-motor controller is configured to receive input indicative of the speed of the electric propulsion motor, to determine a required torque based on the control signal and the current speed of the motor using the required torque. The integrated generator-motor controller can be arranged to determine an indicator of electric power generated by the starter-motor generator. The power demand parameter can be determined using the indicator of electric power generated by the starter-motor generator.

The integrated generator-motor controller can be arranged to control an inverter to control the supply of the electric power to the electric propulsion motor and a switching means configured to allow the active rectifier to be selectably connected to the starter-motor generator or to the propulsion motor through the inverter. The integrated generator-motor controller can also be arranged to measure a current of the electric power supplied to the electric motor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
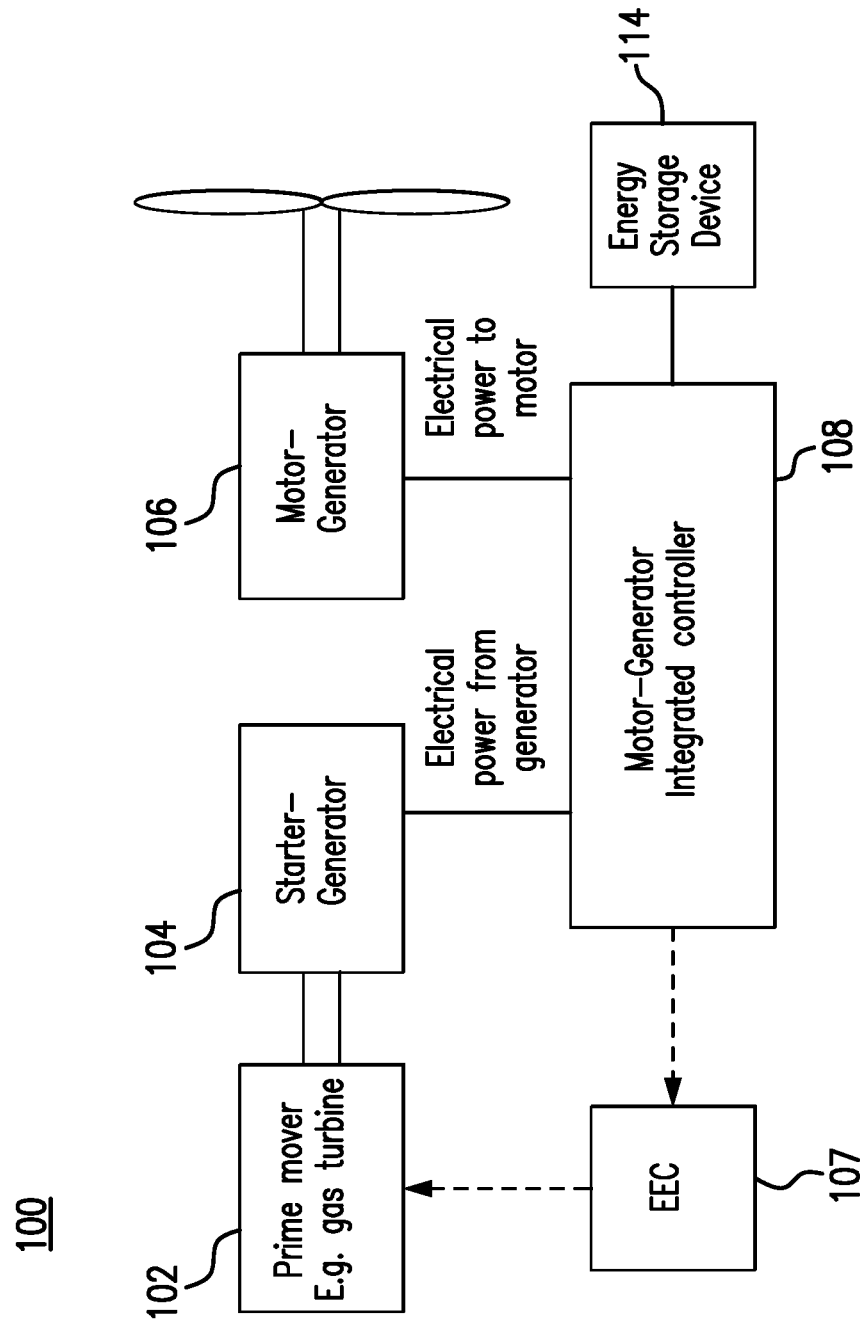
FIG. 1 is a block schematic view of an electric propulsion system.

Reference will now be made to the drawings wherein like reference numerals identify similar structural features or aspects of the subject invention. For purposes of explanation and illustration, and not limitation, a partial view of an exemplary embodiment of an electric propulsion system in accordance with the invention is shown in FIG. 1 and is designated generally by reference character 100. Other embodiments of an electric propulsion system in accordance with the invention, or aspects thereof, are provided in FIGS. 2-3, as will be described. The systems of the invention can be used to control power to and from a prime mover, or an energy storage device, such as a battery, and to an electric propulsion motor.

Referring to FIG. 1, the electric propulsion system 100 includes a prime mover 102, such as a gas-turbine engine, a starter-motor generator 104, such as a PM generator, configured to be driven by the prime mover 102 to generate electric power, an electric propulsion motor 106, and an integrated generator-motor controller 108 arranged to control the supply of the electric power to the electric propulsion motor 106 in response to a control signal. The motor-generator controller 108 also includes feedforward (FF) output to the prime mover controller 107 (EEC) for improved performance. Also, includes an energy storage device 114, e.g. battery, as a source of energy for electric start of the prime mover (aircraft engines), and supplemental source of energy for propulsion (and other aircraft loads).

Figure 2:
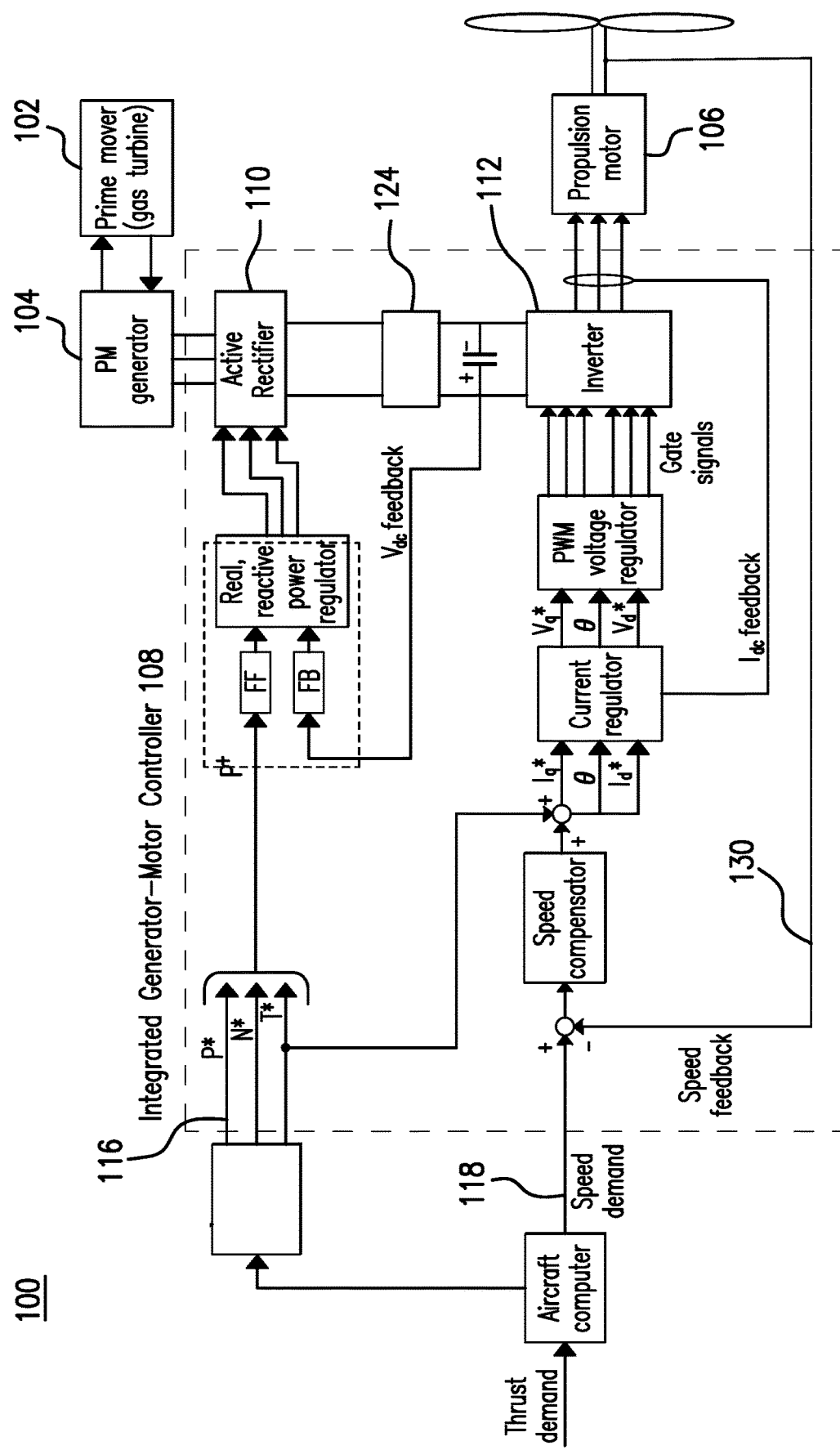
FIG. 2 is a detailed schematic view of the generator of FIG. 1, showing an example of the generator with an Active Rectifier.

Referring to FIG. 2, the integrated generator-motor controller 108 includes an active rectifier 110, fed by the PM generator 104, controlled to regulate the dc link voltage by switch 124. The DC link sources the downstream inverter 112 which is controlled to regulate the speed (or torque) of the propulsion motor 106. The active rectifier 110 and controller includes a second mode to feed-forward to an inverter 112 a power demand parameter associated with the control signal to control the power output to the electric propulsion motor 106. The active rectifier 110 is bi-directional. The electric propulsion system 100 includes an energy storage device 114, such as a battery system, connected to the integrated generator-controller 108, at the switch 124. The energy storage device 114 enables the system to use the electric propulsion motor 106 as a generator to harvest energy while wind milling. It also allows harvesting energy during thrust reversal with reverse pitching of propellers of the electric propulsion motor 106. The active rectifier 110 allows the system to electric-start the prime mover (engine) with the active rectifier 110 operated as an inverter. The active rectifier 110 allows the system used for both the propulsion and starter functions, thus minimizing weight penalty without additional mode-switching contactors. During aircraft flight, energy recovered from the electric propulsion motor 106 during windmilling or thrust reversal with reverse pitching of the propellers can be used to re-charge the energy storage device 114.

With the use of an active rectifier 110, required to control power from the PM generator 104, the un-desirable low frequency current harmonics (5th, 7th, 11th, 13th of the fundamental generator operating frequency), produced as a result of the rectification process and reflected back into the generator are virtually eliminated. Low frequency current harmonics (5th, 7th, 11th, 13th of the fundamental frequency) that can result in significant generator winding losses will be reduced, requiring less cooling. This also allows generator 104 to be designed for higher power density or reduced weight. The better power quality on the generator-side allows for legacy AC loads to be directly powered by the generator 104, if system load architecture requires that. Further, with regards to the engine start functionality, the active rectifier 110 serves as an inverter, eliminating the need for the additional mode-switching contactors between the inverter 112 and propulsion motor 106.

The integrated generator-motor controller 108 can be arranged to control an inverter 112 to control the supply of the electric power to the electric propulsion motor 106 and a switch 124 configured to allow the active rectifier 110 to be connected to either the PM starter-motor generator 104 or to the electric propulsion motor 106 through the inverter. The integrated generator-motor controller can e also be arranged to measure a current of the electric power supplied to the electric motor 106.

The configuration discussed above further enables the starter-motor generator 104 to be used to start up the prime mover 102 by using stored energy in the battery system 114 or other electrical power source. As it is unlikely that both the propulsion and the starting functions are used simultaneously, except for in air re-starts, this implementation eliminates the necessity of a dedicated starter for the prime mover 102 and maximizes the usage of the starter-motor generator 104 and the inverter 112.

Figure 3:
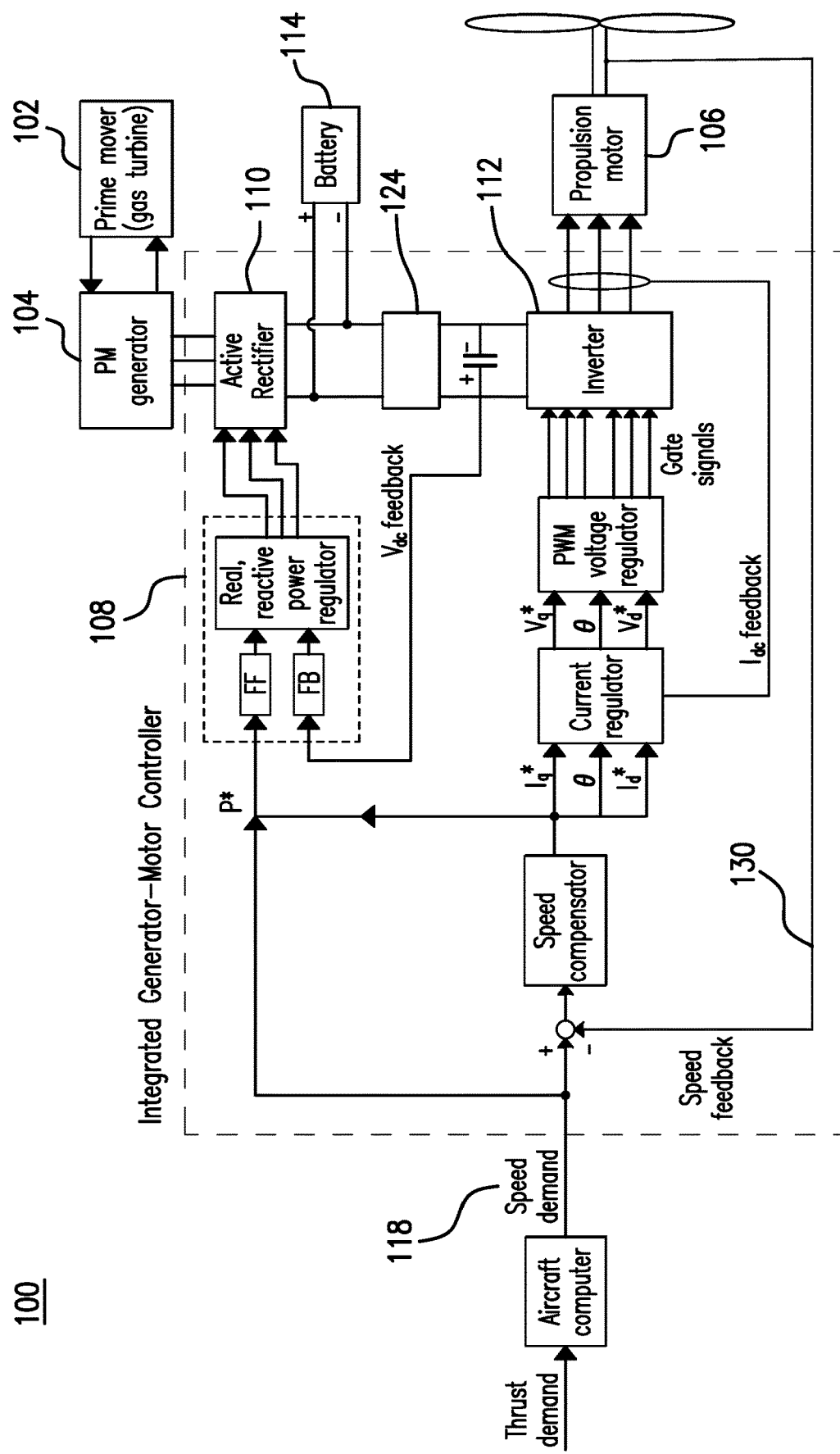
FIG. 3 is a detailed schematic view of the generator of FIG. 1, showing an example of the generator with alternative Feed Forward signals.

Referring to FIG. 3, the control signal can include at least one of a propulsion motor speed command, a thrust command, a torque command, or a power command 116. The power demand parameter can also include an instantaneous power demand. The integrated generator-motor controller 108 is configured to receive input 118 indicative of the speed of the electric propulsion motor 106, to determine a required torque based on the control signal and the current speed of the electric propulsion motor 106 using the required torque. The integrated generator-motor controller 108 can be arranged to determine an indicator of electric power generated by the PM starter-motor generator 104 and using the indicator of electric power generated by the PM starter-motor generator 104. The feed-forward could also be applied the active rectifier to start boosting the DC link in anticipation of the power demand.

The integrated generator-motor controller 108 utilizes instantaneous power demand P* which is calculated from the motor speed demand and torque current demand Iq* as a feed forward (FF) compensation for the regulation of the DC link voltage. Actual motor speed and current can also be used as the FF compensation. The integrated generator-motor controller 108 also uses DC-link voltage as a source of feedback (FB) compensation 130. The combination of FF and FB compensations improves the dynamic performance of the generator-active rectifier system as well as maintaining stability. The addition of the power feedforward allows for increased commanded speed changes. The improved power supply from the generator 104 improves the performance of the propulsion motor as the loop gain is less variable with more stable DC-link voltage. The integrated generator-motor controller 108 can be tuned such that the bandwidth of power draw is within the bandwidth of the generator. An addition of command state-filters and/or detuning may be utilized as necessary. This arrangement also reduces the requirement for filter components in the DC-bus.

The methods and systems of the present disclosure, as described above and shown in the drawings, provide for electrical power system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. An electric propulsion system comprising:
a prime mover;
a starter-motor generator configured to be driven by the prime mover to generate electric power;
an electric propulsion motor; and
an integrated generator-motor controller arranged to control the supply of the electric power to the electric propulsion motor in response to a control signal, wherein the integrated generator-motor controller includes an active rectifier integrated into the generator-motor controller configured in a first mode to feedforward to the starter-motor generator a power demand parameter associated with the control signal so as to control the power output of the starter-motor generator in order to start the prime mover, wherein the integrated generator-motor controller utilizes DC-link voltage as a source of feedback (FB) compensation.

2. The electric propulsion system of claim 1, wherein the active rectifier is configured in a second mode to feedforward to an inverter a power demand parameter associated with the control signal so as to control the power output of the generator to the electric propulsion motor.

3. The electric propulsion system of claim 1, wherein the control signal comprises at least one of a motor speed command, a thrust command, a torque command or a power command.

4. The electric propulsion system of claim 1, wherein the power demand parameter comprises an instantaneous power demand.

5. The electric propulsion system of claim 1, wherein the prime mover is a gas turbine engine.

6. The electric propulsion system of claim 1, wherein the integrated generator-motor controller is configured to receive input indicative of the speed of the electric propulsion motor.

7. The electric propulsion system of claim 6, wherein the integrated generator-motor controller is configured to determine a required torque based on the control signal and the current speed of the motor.

8. The electric propulsion system of claim 7, wherein the power demand parameter is determined using the required torque.

9. The electric propulsion system of claim 6, wherein the integrated generator-motor controller is arranged to determine an indicator of electric power generated by the starter-motor generator.

10. The electric propulsion system of claim 9, wherein the power demand parameter is determined using the indicator of electric power generated by the starter-motor generator.

11. The electric propulsion system of claim 1, further comprising an energy storage device connected to the integrated generator-motor for starting the prime mover using the stored energy.

12. The electric propulsion system of claim 1, wherein the integrated generator-motor controller is arranged to control an inverter to control the supply of the electric power to the electric propulsion motor.

13. The electric propulsion system of claim 12, further comprising a switch to allow the active rectifier to be selectably connected to the starter-motor generator or to the propulsion motor.

14. The electric propulsion system of claim 1, wherein the integrated generator-motor controller is arranged to measure a current of the electric power supplied to the electric motor.

15. The electric propulsion system of claim 1, wherein the starter-motor generator is a PM generator.

16. The electric propulsion system of claim 1, wherein the integrated generator-motor controller is tuned such that a bandwidth of power draw is within a bandwidth of the starter-motor generator.

* * * * *